3,709,783
PROCESS FOR PRODUCING PROTEINS BY
FERMENTATION
Katsunobu Tanaka, Takeo Suzuki, Ken Yamaguchi, and Masaki Yamamoto, Machida, Japan, assignors to Kyowa Hakko Kogyo Co., Ltd., Tokyo, Japan
No Drawing. Continuation-in-part of abandoned application Ser. No. 677,862, Oct. 25, 1967. This application July 2, 1970, Ser. No. 52,067
Claims priority, application Japan, Oct. 28, 1966, 41/70,720
Int. Cl. C12b 1/00; A23j 1/00
U.S. Cl. 195—28 R          13 Claims

ABSTRACT OF THE DISCLOSURE

A process for producing proteins by fermentation which comprises culturing a microorganism capable of assimilating hydrocarbons and which belongs to the genus Arthrobacter, Brevibacterium, Micrococcus, Corynebacterium, Bacterium, Pseudomonas, Mycobacterium, Nocardia, Candida or Aspergillus under aerobic conditions in an aqueous nutrient medium containing at least one hydrocarbon as the main carbon source. The proteins accumulate extracellularly in the resultant culture liquor. An agent to help discharge the proteins into the medium may also be included therein, for example, antibiotics, surface active agents, higher fatty acids or higher fatty acid esters.

---

This application is a continuation-in-part of copending application Ser. No. 677,862, filed on Oct. 25, 1967 and now abandoned.

This invention relates to a process for producing proteins. More particularly, it relates to a process for the production of proteins by fermentation, wherein the proteins are directly accumulated extracellularly in the resultant culture liquor. Even more particularly, the invention relates to a process for the production of proteins by fermentation with hydrocarbon-assimilating microorganisms in the presence of hydrocarbons as the main carbon source.

Recently, the production of the cells of microorganisms from kerosene and like hydrocarbons as the starting material has attracted attention as a way of producing food and fodder, and several reports relating to this problem have appeared in the prior art. However, some problems have remained unsolved in such processes, particularly with respect to the elimination of hydrocarbons mixed in the microorganism cells and further with respect to the extraction and isolation of protein from the microorganism cells and further with respect to the extraction and isolation of protein from the microorganism cells in order to obtain a practical use thereof.

Quite clearly, it would be a distinct advantage to be able to produce and isolate the protein found in microorganism cells readily and effectively. Accordingly, the present inventors have conducted studies aimed at overcoming the above-mentioned problems.

One of the objects of the present invention is to provide an improved process for the production of protein which overcomes the disadvantages and deficiencies of the prior art methods.

Another object of the present invention is to provide a process for producing proteins by fermentation which may be carried out in an efficacious and advantageous manner.

A further object of the invention is to provide a process for producing proteins by fermentation which may be carried out advantageously on an industrial scale at relatively low cost to give a high yield of product.

A still further object of the invention is to provide proteins.

These and other objects and advantages of the present invention will become apparent to those skilled in the art from a consideration of the following specification and claims.

In accordance with the present invention, the present inventors have found that a significant amount of protein is directly discharged in the culture liquor when microorganisms capable of assimilating hydrocarbons are cultured in a suitable nutrient culture medium containing hydrocarbons. The proteins are directly accumulated extracellularly in the fermentation liquor. The gist of the present invention is to obtain proteins directly in a culture medium by cultivating microorganisms in a medium containing a lipophilic substance, such as, hydrocarbons, whereby the microorganisms come into contact with said lipophilic substance to dissolve the lipids within the surface layers of the cells of the microorganisms, with the result that the protein formed in the microorganism cells is liberated therefrom to accumulate extracellularly in the medium. Hence, the intercellular proteins are gradually liberated and discharged into the medium because growing microorganisms having immature surface layers of cells are permitted to come into contact with the hydrocarbons during the course of reproduction.

Heretofore, when utilizing the cells of microorganisms as food, an important problem has been the extraction of the proteins from the microorganism cells. It is quite clear that the proper extraction of protein from the bacterial cells in an effective manner is required in order to obtain a high yield thereof on an industrial scale; however, this has been extremely difficult or impossible. On the contrary, the process of the present invention solves this problem since the protein is directly produced in an aqueous solution thereby making it easily isolable from the remaining hydrocarbons. Consequently, with the process of the present invention, it is unnecessary to follow a procedure of extracting the protein from the bacterial cells. The present invention thus provides an extremely advantageous industrial scale process for the production of protein by the use of hydrocarbons as the starting material.

Moreover, because microorganisms capable of utilizing hydrocarbons have a strong affinity with hydrocarbons, it is observed that almost all of the microorganism cells gather in the oil layer part and merely exist in the water layer part. Accordingly, the separation of the hydrocarbons from the bacterial cells can be carried out most advantageously.

The process of producing the cells of microorganisms by the use of hydrocarbons as a starting material has been a well known fact in the art. The novel point of the present invention is that the present inventors have found for the first time a process for directly accumulating proteins extracellularly in a culture medium. Approximately 80% or more by weight of the protein contained in the bacterial cells is discharged into the aqueous solution. It is thus believed to be proper to classify the present invention as a process for producing proteins by fermentation.

Microorganisms capable of assimilating hydrocarbons and of growing therewith are employed in the process of the present invention. Examples thereof include the following:

*Arthrobacter paraffineus*
*Arthrobacter roseoparaffinus*
*Micrococcus paraffinolyticus*
*Corynebacterium hydrocarboclastus*
*Bacterium aliphaticum*
*Pseudomonas aeruginosa*

*Mycobacterium lactula*
*Candida lipolytica*
*Aspergillus oryzae*
*Micrococcus ureae*
*Pseudomonas fluorescens*
*Nocardia hydrocarbonxydans*
*Mycobacterium paraffinicum*

As can be seen from the above list, microorganisms having the capability of producing and accumulating proteins by utilizing hydrocarbons as the main carbon source exist widely in genus and family. Accordingly, the present invention is not generally limited to any particular family or genus of microorganisms. However, preferred microorganisms to be employed belong to the genus selected from the group consisting of:

Arthrobacter, Brevibacterium, Micrococcus, Corynebacterium, Pseudomonas, Nocardia and Mycobacterium.

These microorganisms have a high capability of assimilating microorganisms and, thus, provide the most effective results in accordance with the present invention.

Either a synthetic culture medium or a natural nutrient medium is suitable in the present invention as long as it contains nutrients necessary for the growth of the particular strain employed. Such nutrients are well known in the art and include substances such as a carbon source, a nitrogen source, inorganic compounds and the like which are utilized by the microorganism employed in appropriate amounts. In accordance with the present invention, the medium contains a hydrocarbon as the main carbon source.

Kerosene is one of the preferred hydrocarbons employed in the process of the present invention. However, other hydrocarbons may be readily and advantageously employed. Such hydrocarbons include straight- and branched-chain paraffins (alkanes) containing from 5 to 25 carbon atoms, such as n-pentane, n-octane, n-decane, n-dodecane, n-hexadecane, isopentane, isooctane, etc., cycloparaffins such as cyclohexane and cyclooctane, straight and branched-chain olefins such as pentene-2, hexene-1, octene-1, octene-2, etc. cycloolefins such as cyclohexene, aromatic hydrocarbons such as benzene, o-xylene, etc., and mixtures thereof and mixed hydrocarbons such as those obtained from petroleum, for example, light oils, heavy oils, paraffin oils, naphtha, etc.

Small amounts of other carbon sources such as glucose, fructose, mannose, galactose, sucrose, starch, starch hydrolysate, waste molasses, etc., i.e., carbohydrates in general, or any other suitable carbon source such as glycerol, mannitol, sorbitol and the like may be used in the fermentation medium along with the hydrocarbon or hydrocarbon mixture.

As a nitrogen source, various kinds of inorganic or organic salts or compounds, such as urea or ammonia or ammonium salts such as ammonium sulfate, ammonium chloride, ammonium nitrate, etc., or natural substances containing nitrogen such as cornsteep liquor, peptone, meat extract, yeast extract, casein hydrolysates, fish meal, etc. may be employed. Mixtures of two or more of these substances may be used.

Inorganic compounds which may be added to the culture medium include magnesium sulfate, potassium dihydrogen phosphate, potassium monohydrogen, phosphate, sodium chloride, iron sulfate, manganese chloride, calcium chloride, or other conventionally used salts of magnesium, iron, manganese, zinc, calcium and the like. Mixtures of such inorganic compounds may be employed.

Also, nutrients essential for the growth of the particular strain employed may be added to the medium, for example, vitamins such as biotin, thiamine, pantothenic acid, p-aminobenzoic acid, nicotinic acid, etc. and various kinds of amino acids such as glutamic acid, etc.

The fermentation is conducted under aerobic conditions, such as aerobic shaking of the culture or with stirring of a submerged culture with the introduction of sterilized air thereinto, at a temperature of about 20° to 60° C. During culturing, the pH is adjusted to between 4 and 10 (preferably, between 6 and 9) by adding a urea solution, ammonia water, ammonia gas, ammonium carbonate or the like thereto.

Fermentation is usually completed within one to three days. At that time, the measured value of total protein is maximum.

In carrying out the process of the present invention, it has also been found that the addition of antibiotics, surface active agents, fatty acids and the like as accelerating agents for discharging the proteins into the medium is an effective measure. However, it is not essential to use a discharging agent and the process can be carried out in the absence thereof, as can be seen from Example 1. Antibiotics which may be used for this purpose include those such as penicillin, bacitracin, streptomycin, cycloserine, etc. Suitable surface active agents include any of the nonionic, cationic, anionic or amphoteric surface active agents known in the art. Especially effective are the polyoxyethylene sorbitan fatty acid esters ($C_{12}$–$C_{18}$; Tween series), and the alkylamine salts thereof ($C_8$–$C_{18}$), the polyoxyethylene alkylamines ($C_{12}$–$C_{18}$; Nymeen series), the polyoxyethylene alkyl ethers ($C_{12}$–$C_{18}$), the polyoxyethylene alkyl allyl ethers ($C_8$–$C_{18}$), the alkyl trimethyl ammonium halides ($C_{12}$–$C_{18}$), the alkyl benzyl dimethyl ammonium halides ($C_{12}$–$C_{18}$) the alkyl pyridinium halides ($C_{12}$–$C_{18}$), the alkyl betaines ($C_{12}$–$C_{18}$) and the like. Specific examples thereof include Nymeen S–204, Nonion E215, Tween 20, Cation SA 2502, Nonion L–4, etc. Various kinds of higher fatty acids, such as oleic acid, palmitic acid, stearic acid, etc., and salts thereof, higher fatty acid esters, such as sorbitan monooleate, the oleic acid ester of polyoxyethylene glycol, the palmitic acid ester of polyoxyethylene glycol, etc., are also suitable, and various combinations of these compounds work effectively.

After the completion of fermentation, the protein obtained may be separated from the fermentation liquor by conventional means, such as centrifugation, precipitation and the like.

The following examples are given merely as illustrative of the present invention and are not to be considered as limiting. Unless otherwise noted, the percentages therein and throughout the application are by weight.

EXAMPLE 1

*Arthrobacter paraffineus* No. 2411 ATCC 15591 is cultured in a seed medium consisting of 1.0% of meat extract, 1.0% of peptone and 0.5% of sodium chloride at a pH of 7.2 (before sterilization) with aerobic shaking for 24 hours. Then, the thus cultured bacterium is inoculated in a ratio of 10% (by volume) into 3.0 liters of a fermentation medium contained in a 5 liter jar fermentor. The fermentation medium has the following composition:

0.2% $K_2HPO_4$
0.1% $MgSO_4 \cdot 7H_2O$
0.002% $MnSO_4 \cdot 4H_2O$
0.02% $FeSO_4 \cdot 7H_2O$
0.001% $ZnSO_4 \cdot 7H_2O$
0.5% $NH_4NO_3$
0.1% cornsteep liquor Culturing is started and, just after the beginning of culturing, 100 ml. of a mixture of n-paraffins containing from 11 to 18 carbon atoms is added to the fermentation medium. Culturing is conducted with agitation at 600 r.p.m. and with aeration with sterile air at the rate of one liter per liter per minute at 30° C. for 40 hours. The pH of the culture medium is adjusted to between 6.5 and 7.5 with ammonia water during culturing. After the completion of culturing, the amount of protein produced in the aqueous solution is 7 g./l.

Subsequently, 2.8 liters of the aqueous solution obtained by centrifugal separation of the fermentation liquor is adjusted to a pH of 3–4. Centrifugal separation of the protein produced gives 19 grams of crude protein. The thus obtained crude protein is dissolved in water (pH 7-8) again, and this protein is precipitated at a pH of 3-4. Centrifugal separation thereof is again carried out. These procedures are repeated twice. As a result, 17 grams of purified protein is obtained by freeze-drying.

EXAMPLE 2

*Brevibacterium ketoglutamicum* No. 2473 ATCC 15588 is cultured in a 5 liter jar fermentor under the same conditions and in the same medium as described in Example 1, except that kerosene is used as the carbon source. After 48 hours of culturing, 9 grams of protein is obtained from the fermentation liquor.

EXAMPLE 3

Culturing is conducted in the same manner and in the same medium as described in Example 1, except that 200 ml. of a mixture of n-paraffins containing $C_{15}$-$C_{20}$ fractions is used as the carbon source. Also, 10 units of penicillin per 1 milliliter of the fermentation liquor is added to the medium 15 hours after the beginning of culturing. Culturing is carried out for 72 hours.

After the completion of culturing, the amount of protein found to be accumulated in the fermentation liquor is 15 g./l.

EXAMPLE 4

Culturing is conducted in the same manner and in the same medium as described in Example 1, using the microorganism strains shown in Table 1. The amounts of protein produced in the medium after 80 hours of cultivation in the absence of a discharging agent and in the presence of penicillin and soribtan monooleate, respectively, are shown in the table.

TABLE 1

| Microorganism strain | Amount of protein produced (after 80 hrs.) | | |
|---|---|---|---|
| | Without discharging agent, g./l. | Addition of penicillin, g./l. | Addition of sorbitan monooleate, g./l. |
| *Micrococcus ureae* ATCC 21238 | 7.1 | 13.5 | 10.1 |
| *Micrococcus paraffinolyticus* ATCC 15589 | 7.5 | 14.7 | 10.5 |
| *Corynebacterium hydrocarboclastus* ATCC 15592 | 8.2 | 17.2 | 13.5 |
| *Pseudomonas fluorescens* ATCC 948 | 5.9 | 13.5 | 11.2 |
| *Pseu omonas aeruginosa* ATCC 15246 | 5.2 | 13.1 | 10.9 |
| *Nocardia hydrocarbonoxydans* ATCC 15104 | 9.1 | 14.6 | 12.6 |
| *Mycobacterium paraffinicum* ATCC 12670 | 4.7 | 11.2 | 9.7 |

EXAMPLE 5

Culturing is carried out in the same manner as described in Example 1, using *Corynebacterium hydrocarboclastus* ATCC 15592 as the microorganism strain. The effects of using various additives, including antibiotics and surface active agents as indicated in Table 2, on the yield of protein after 80 hours of cultivation are indicated in said table. Each additive was put into the medium during the growing phase of the cells (after approximately 15 hours of cultivation).

TABLE 2

| Additive | Amount of protein produced after 80 hours of cultivation g./l. |
|---|---|
| None | 8.2 |
| Penicillin | 16.8 |
| Bacitracin | 9.6 |
| Streptomycin | 10.1 |
| Cycloserine | 11.5 |
| Cephalosporin C | 15.6 |
| Oleic acid | 10.5 |
| Sorbitan monostearate | 10.2 |
| Sucrose distearate ester | 9.6 |
| Methyl oleate | 10.1 |

The invention being thus described, it will be obvious that the same may be varied in many ways. Such variations are not to be regarded as a departure from the spirit and scope of the invention, and all such modifications as would be obvious to one skilled in the art are intended to be included herein.

We claim:

1. A process for producing proteins which comprises culturing a microorganism selected from the group consisting of:

*Arthrobacter paraffineus* ATCC 15591,
*Brevibacterium ketoglutamicum* ATCC 15588,
*Micrococcus ureae* ATCC 21288,
*Micrococcus paraffinolyticus* ATCC 15589,
*Corynebacterium hydrocarboclastus* ATCC 15592,
*Pseudomonas fluorescens* ATCC 948,
*Pseudomonas aeruginosa* ATCC 15246,
*Nocardia hydrocarboxydans* ATCC 15104, and
*Mycobacterium paraffinicum* ATCC 12670 under aerobic conditions in an aqueous nutrient medium containing at least one hydrocarbon as the main carbon source, directly accumulating the proteins extracellularly in the resultant culture liquor, and then isolating and recovering said proteins therefrom.

2. The process of claim 1, wherein said hydrocarbon is kerosene.

3. The process of claim 1, wherein said hydrocarbon is a paraffin having from 5 to 25 carbon atoms.

4. The process of claim 1, wherein said hydrocarbon is an olefin.

5. The process of claim 1, wherein said hydrocarbon is benzene or a lower alkyl-substituted derivative thereof.

6. The process of claim 1, wherein said hydrocarbon is a petroleum fraction.

7. The process of claim 1, wherein the culturing is carried out at a temperature of from about 20° to 60° C. and at a pH of from about 4 to 10.

8. A process for producing proteins which comprises culturing a microorganism selected from the group consisting of:

*Arthrobacter paraffineus* ATCC 15591,
*Brevibacterium ketoglutamicum* ATCC 15588,
*Micrococcus ureae* ATCC 21288,
*Micrococcus paraffinolyticus* ATCC 15589,
*Corynebacterium hydrocarboclastus* ATCC 15592,
*Pseudomonas fluorescens* ATCC 948,
*Pseudomonas aeruginosa* ATCC 15246,
*Nocardia hydrocarboxydans* ATCC 15104, and
*Mycobacterium paraffinicum* ATCC 12670 under aerobic conditions in an aqueous nutrient medium containing at least one hydrocarbon as the main carbon source, and a discharging agent for the proteins selected from the group consisting of antibiotics, surface active agents, higher fatty acids, esters of higher fatty acids and mixtures thereof, directly accumulating the proteins extracellularly in the resultant culture liquor, and then isolating and recovering said proteins therefrom.

9. The process of claim 8, wherein the antibiotic is selected from the group consisting of penicillin, bacitracin, streptomycin, cycloserine and Cephalosporin C.

10. The process of claim 8, wherein the surface active agent is a polyoxyethylene compound.

11. The process of claim 8, wherein said hydrocarbon is selected from the group consisting of kerosene, n-paraffins having from 5 to 25 carbon atoms, olefins, benzene, lower alkyl-substituted derivatives of benzene, light oils, heavy oils, naphtha and mixtures thereof.

12. The process of claim 8, wherein the culturing is carried out at a temperature of from about 20° to 60° C. and at a pH of from about 4 to 10.

13. The process of claim 12, wherein said hydrocarbon is selected from the group consisting of kerosene, n-paraffins having from 5 to 25 carbon atoms, olefins, benzene, lower alkyl-substituted derivatives of benzene, light oils, heavy oils, naphtha and mixtures thereof.

References Cited

UNITED STATES PATENTS

| | | | |
|---|---|---|---|
| 3,222,258 | 12/1965 | Izuka et al. | 195—3 HX |
| 3,293,145 | 12/1966 | Leavitt | 195—28 R |
| 3,337,413 | 8/1967 | Wegner | 195—28 R |
| 3,359,178 | 12/1967 | Tanaka et al. | 195—28 R |
| 3,498,883 | 3/1970 | Iguchi et al. | 195—28 R |
| 3,511,752 | 5/1970 | Tanaka et al. | 195—28 R |

JOSEPH M. GOLIAN, Primary Examiner

U.S. Cl. X.R.

99—14